United States Patent [19]

Igarashi et al.

[11] 4,283,458

[45] Aug. 11, 1981

[54] HEAT-SENSITIVE RECORDING PAPER CONTAINING A NOVEL ELECTRON ACCEPTING COMPOUND

[75] Inventors: Akira Igarashi, Fujinomiya; Kozo Sato, Minami-ashigara, both of Japan

[73] Assignee: Fuji Photo Film Co., Ltd., Minami-ashigara, Japan

[21] Appl. No.: 58,399

[22] Filed: Jul. 17, 1979

[30] Foreign Application Priority Data

Aug. 18, 1978 [JP] Japan ................................ 53-100599

[51] Int. Cl.$^3$ .......................... B32B 9/04; B32B 21/04

[52] U.S. Cl. .................................... 428/341; 282/27.5; 427/144; 427/151; 428/411; 428/480; 428/537; 428/913

[58] Field of Search ............... 427/144, 145, 146, 148, 427/151, 150, 341; 428/537, 913, 411, 480; 282/27.5; 96/114.1; 430/353, 618, 965

[56] References Cited

U.S. PATENT DOCUMENTS

| | | | |
|---|---|---|---|
| 3,445,261 | 5/1969 | Talvalkar | 427/151 |
| 3,539,375 | 11/1970 | Baum | 428/537 |
| 3,674,535 | 7/1972 | Blose et al. | 428/539 |
| 3,792,481 | 2/1974 | Nagashima et al. | 427/144 |
| 3,816,122 | 6/1974 | Hamb | 96/114.1 |
| 3,895,173 | 7/1975 | Adachi | 428/913 |
| 3,937,864 | 2/1976 | Kohmura et al. | 427/151 |
| 3,950,600 | 4/1976 | Knirsch et al. | 427/151 |
| 3,959,571 | 5/1976 | Yahagi et al. | 427/151 |
| 4,012,554 | 3/1977 | Miller et al. | 427/151 |
| 4,144,072 | 3/1979 | Ikenoue et al. | 96/114.1 |
| 4,151,748 | 5/1979 | Baum | 427/146 |

FOREIGN PATENT DOCUMENTS 51-29830 8/1976 Japan .

*Primary Examiner*—Ronald H. Smith
*Assistant Examiner*—S. L. Childs
*Attorney, Agent, or Firm*—Sughrue, Mion, Zinn, Macpeak and Seas

[57] ABSTRACT

A heat-sensitive recording sheet comprising a support and a recording layer containing an electron donating colorless dye and a compound represented by the following formula:

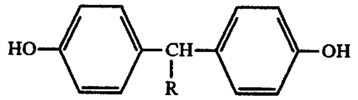

wherein R represents an alkyl group containing 2 to 12 carbon atoms.

8 Claims, No Drawings

HEAT-SENSITIVE RECORDING PAPER CONTAINING A NOVEL ELECTRON ACCEPTING COMPOUND

BACKGROUND OF THE INVENTION

1. Field of the Invention

The present invention relates to a heat-sensitive recording paper and, more particularly, to a heat-sensitive recording paper capable of forming a dye image having improved preservability under high temperature and high humidity conditions.

2. Description of the Prior Art

In heat-sensitive recording papers images are formed utilizing physical or chemical changes in the materials induced by heat energy, and a large number of processes using heat-sensitive recording papers have been investigated.

One type of heat sensitive recording paper which relies upon a heat induced physical change is a so-called wax type heat-sensitive recording paper which has been well known and used for recording electrocardiograms and the like. On the other hand, as a material utilizing a chemical change due to heat to form images, a number of materials based on various different color-forming mechanisms have been proposed. Of these, a binary coloration system is most typical.

A binary coloration system is prepared by dispersing two heat-reactive compounds as fine particles in a binder or the like such that the binder separates them from each other, and coating the resultant mixture on a base paper. The thus prepared paper records images by heating it to melt one or both of the compounds such that they come into contact with each other, thus causing a color-forming reaction. These two heat-reactive compounds are generally referred to as electron donating compounds and electron accepting compounds, respectively. An extremely large number of combinations of them are known, and they are roughly classified as systems forming images of a metal compound and systems forming dye images.

Representative examples of systems forming images of a metal compound are those in which the electron donating compounds are organic reducing agents such as phenols, chelating agents, sulfur compounds, or amino compounds and the electron accepting compounds are organic metal salts. These two produce a metal, metal complex compound, metal sulfide, or the like through the reaction therebetween upon being heated, thus providing a colored image. Specifically, there are a combination of thiourea and heavy metal salt (U.S. Pat. No. 2,740,895), a combination of gallic acid or the like and metal salt of stearic acid (U.S. Pat. Nos. 2,663,654, 2,663,655, 2,663,656, and 2,663,657), a combination of hydroquinone and silver behenate (U.S. Pat. No. 3,031,329), a combination of hexamethylenetetramine and tin compound U.S. Pat. No. 2,813,043), and the like.

On the other hand, examples of systems forming dye images are those in which the electron donating compound is an electron donating colorless dye, and the electron accepting compound is an acidic material such as phenol or the like (Japanese Patent Publication No. 4,160/68 and U.S. Pat. No. 3,451,338).

The binary coloration systems of heat-sensitive recording papers have many advantages as recording papers. For example, (1) they are based on primary coloration and do not require development processing:

(2) the paper quality is approximate to that of ordinary paper; and (3) they are handled with ease. In particular, those materials wherein a colorless dye is used as the electron donating compound have the additional advantages that (4) they provide higher color density and (5) they enable one to easily obtain heat-sensitive recording papers forming different colors, thus being more valuable. Therefore, they are in the most use as heat-sensitive recording papers.

As the electron donating colorless dyes, triarylmethane compounds, diphenylmethane compounds, xanthene compounds, thiazine compounds, spiropyran compounds, and the like have been used. Several examples thereof are illustrated below. As the triarylmethane compounds, there are 3,3-bis(p-dimethylaminophenyl)-6-dimethylaminophthalide (or crystal violet lactone), 3,3-bis(p-dimethylaminophenyl)-phthalide, 3-(p-dimethylaminophenyl)-3-(1,3-dimethylindol-3-yl)phthalide, 3-(p-dimethylaminophenyl)-3-(2-methylindol-3-yl)phthalide, etc. As the diphenylmethane compounds, there are 4,4'-bis-dimethylaminobenzhydrin benzyl ether, N-halophenyl-leucoauramine, N-2,4,5-trichlorophenylleucoauramine, etc. As the xanthene compounds, there are rhodamine-B-anilinolactam, rhodamine-B-(p-nitroanilino)lactam, Rhodamine-B-(p-chloroanilino)lactam, 3-diethylamino-7-(dibenzylamino)fluoran, 3-diethylamino-7-phenylaminofluoran, 3-diethylamino-6-methyl-7-anilinofluoran, 3-diethylamino-7-(o-chloroanilino)fluoran, 3-diethylamino-7-(3,4-dichloroanilino)fluoran, 3-piperidino-6-methyl-7-anilinofluoran, 3-diethylamino-7-phenylfluoran, etc. As the thiazine compounds, there are benzoyl leucomethylene blue, p-nitrobenzyl leucomethylene blue, etc. As the spiro compounds, there are 3-methyl-spiro-dinaphthopyran, 3-ethyl-spiro-dinaphthopyran, 3,3'-dichloro-spiro-dinaphthopyran, 3-benzyl-spiro-dinaphthopyran, 3-methyl-naphtho-(3-methoxybenzo)-spiropyran, 3-propyl-spiro-dibenzopyran, etc. They may be used alone or in combination.

Specific examples of conventional electron accepting compounds include phenol compounds, organic acids or metal salts thereof, hydroxybenzoic acid esters, etc. Of these compounds, phenol compounds are favorably used because they have a melting point which is near the desired recording temperature (70° to 120° C.) and they do not require the use of a low-melting compound or, if any, in only a small amount. They are described in detail in, for example, Japanese Patent Publication No. 29,830/76, and U.S. Pat. 3,539,375. To be specific, there are illustrated 4-t-butylphenol, 4-phenylphenol, 4-hydroxydiphenoxide, α-naphthol, β-naphthol, methyl-4-hydroxybenzoate, 2,2'-dihyroxybiphenyl, 2,2-bis(4-hydroxyphenyl)propane (bisphenol A), 4,4'-isopropylidenebis(2-chlorophenol), 4,4'-isopropylidenebis(2-methylphenol), 4,4'-sec-isobutylidenediphenol, etc. However, these phenol compounds are not necessarily considered to be satisfactory heat-sensitive materials.

That is, frequently they suffer from one of the following defects: (1) inadequate color density is obtained when used in combination with an electron donating colorless dye; (2) fog (i.e., color formation during storage before use) tends to be formed; (3) the color fastness of the images formed is not sufficient. Specifically, 4,4'-isopropylidenediphenol (2,2-bis(4-hydroxyphenyl)propane) most generally used as the phenol compound tends to cause fog, though it provides the highest color density of the above-described electron accepting compounds. When Crystal Violet Lactone is used as an electron donating colorless dye, the phenol compound causes fog during storage under high temperature and high humidity (45° C., 80% RH) conditions and serious fading of a colored images occurs.

In addition to the foregoing, in order to obtain sufficient color density at a color-forming temperature of about 100° C., a melting point-reducing agent must be used together with the phenol compound due to the high melting point of the phenol compound (156° C.). The heat-sensitive recording sheets, particularly those presently used in facsimile recorders, are required to be recorded at recording temperatures of about 80° to 120° C., and hence too high melting points are not preferable.

SUMMARY OF THE INVENTION

A principal object of the present invention is to provide a novel heat-sensitive recording sheet containing an electron accepting phenol compound which provides color images of high density which do not fade with time, under high humid conditions, or upon exposure to light.

Another object of the present invention is to provide a heat-sensitive recording material containing a phenol compound having a melting point suitable for use in heat-sensitive recording materials without the necessity of a melting point reducing agent.

Still another object of the present invention is to provide a heat-sensitive recording material which does not fog upon storage before use under highly humid conditions.

A further object of the present invention is to provide a heat-sensitive recording material which does not require the process of a sensitizing agent.

Research directed to electron accepting compounds which enable one to obtain all the advantages of a heat-sensitive recording sheet using an electron donating colorless dye had led to the following discovery.

That is, that a combination of an electron donating colorless dye and a phenol compound represented by the following formula:

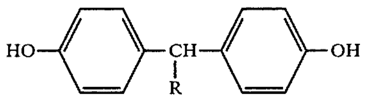

wherein R represents an alkyl group containing 2 to 12 carbon atoms, provides a heat-sensitive recording sheet having extremely excellent color-forming property and preservability.

The above phenol compounds have not been used in heat-sensitive recording sheets. Their characteristic properties are as follows:

(1) When used in combination with an electron donating colorless dye, these phenol compounds provide a colored image having high density and reduced fog.

(2) They provide colored images having a good stability which hardly suffer any fading with time under humid condition or upon light exposure.

(3) Most of these phenol compounds have a melting point in the range of from about 60° to 130° C. and hence they do not require the addition of a melting point reducing agent or the like for constituting a heat-sensitive recording sheet.

(4) They are stable and exhibit substantially no sublimability.

(5) They can be easily synthesized, and highly pure products can be obtained in a high yield. In addition, starting materials for their synthesis are inexpensive.

DETAILED DESCRIPTION OF THE INVENTION

Of the phenol compounds, those wherein R is an alkyl group containing 5 to 8 carbon atoms and particularly a branched chain alkyl group are preferred such as a 1-ethylpentyl group and a 1-methylbutyl group. When the number of carbon atoms in R is not more than 1, the water solubility of the compound is so high that fog tends to occur during storage making such compounds unfavorable. On the other hand, when the number of carbon atoms in R exceeds 13, most of the compounds melt at about room temperature or lower, thus their usefulness is extremely low.

Representative examples of the phenol compounds of the present invention are 1,1-bis(4-hydroxyphenyl)propane, 1,1-bis(4-hydroxyphenyl)butane, 1,1-bis(4-hydroxyphenyl)pentane, 1,1-bis(4-hydroxyphenyl)hexane, 1,1-bis(4-hydroxyphenyl)octane, 1,1-bis(4-hydroxyphenyl)-2-methyl-pentane, 1,1-bis(4-hydroxyphenyl)-2-ethyl-hexane, 1,1-bis(4-hydroxyphenyl)dodecane, etc.

The phenol compounds are easily synthesized by reacting excess phenol with aldehyde as disclosed in U.S. Pat. Nos. 2,468,982 and 2,535,014.

A process of synthesizing the phenol compound of the present invention is exemplified below taking 1,1-bis(4-hydroxyphenyl)-2-ethyl-hexane as an example. Other compounds can be synthesized by analogy.

SYNTHESIS EXAMPLE 47 g of phenol, 4 ml of conc. hydrochloric acid, and 0.5 g of thioglycolic acid were introduced to a flask, and 12.8 g of 2-ethyl-hexylaldehyde was dropwise added thereto under stirring. After completion of the dropwise addition, 6 g of calcium chloride was added thereto and, after standing for 1 day at room temperature, excess phenol was removed by steam distillation, followed by extraction with benzene. Then, benzene was distilled off from the thus obtained benzene extract followed by recrystallization from a mixed solvent of benzene and hexane to obtain 16.3 g of 1,1-bis(4-hydroxyphenyl)-2-ethyl-hexane having a melting point of 87° C.

As the electron donating colorless dyes used in the present invention, those dyes discussed above and conventionally used for the purpose may be used. Of those described above 3-diethylamino-7-(o-chloroanilino)-fluoran, 3-(N-methyl-N-tolylamino)-6-methyl-7-anilino-fluoran, and 3-(N-ethyl-N-tolylamino)-6-methyl-7-anilinofluoran are preferred.

According to the most general process for preparing the heat-sensitive recording paper, the foregoing electron donating colorless dye and the electron accepting compound are dispersed respectively in an amount of about 1 to 10 wt% in separate water-soluble high polymer solution using a ball mill, a sand mill, or the like, and the resulting dispersions are mixed with each other, followed by addition of an inorganic pigment such as kaolin, talc, calcium carbonate, etc. to prepare a coating solution. If necessary, a paraffin wax emulsion, a latex binder, a sensitivity-improving agent, a metallic soap, an ultraviolet ray-absorbing agent, etc. may be added to the composition for effects well known in the art. However, when the phenol compounds of the present invention are used, sensitivity-improving agents are not necessary and the amount of wax, metallic soap, ultraviolet ray-absorbing agent, etc. can be markedly reduced. The phenol compounds of the present invention form color images more stable to light as compared with commonly used bisphenol A, and sticking of the sensitivity-improving agent to a recording head scarcely occurs.

The support for the recording sheet of the present invention may be a plastic film (e.g., polyethylene terephthalate (PET), triacetyl cellulose (TAC), etc.), a paper and the like can be used as a support. The preferred thickness for the films is about 50 to 300 μm. The preferred thickness (base weight) for the paper is 40 to 200 μm (40 to 200 g/$m^2$).

The coating solution is most generally coated on a base paper. The coating amount is generally in the range of about 2 to 10 g per $m^2$(as solids). The layer itself is generally about 1 to 10 μm thick. The lower limit is determined by the density upon color formation upon heating whereas the upper limit is determined mainly for economical reasons.

A preferred coating amount for the phenol compounds is about 0.8 to 5 g/$m^2$. A suitable ratios for the amount of phenol compound to the amount of the electron donating colorless dye is about 2:1 to 10:1.

The present invention will now be described in more detail by the following example, which, however, should not be construed as limiting.

EXAMPLE

Preparation of Samples 1-5:

5 g of the electron donating colorless dye shown in Table 1 was dispersed in 50 g of a 5% polyvinyl alcohol (saponification degree: 99%; polymerization degree: 1,000) aqueous solution using a ball mill for one day and one night. On the other hand, 20 g of an electron accepting compound (phenol compound) similarly shown in Table 1 was dispersed in 200 g of a 5% polyvinyl alcohol aqueous solution using a ball mill for one day and one night. The resulting two dispersions were mixed with each other, and 20 g of kaolin (Georgia kaolin) was added thereto and well dispersed. Further, 5 g of a 50% dispersion of paraffin wax emulsion (made by Chukyo Yushi Co.; Serozole #428) was added thereto to prepare coating solutions.

Each of the thus obtained coating solutions was coated on a base paper having a basis weight of 50 g/$m^2$, in an amount of 6 g/$m^2$ (as solids), and dried for 1 minute at 60° C., followed by super-calendering at a linear pressure of 60 kgW/cm to obtain coated papers.

The resulting coated papers were subjected to heat-coloration using a heated stamp under the conditions of 500 g/$cm^2$ pressure and 1 second in heating time while varying the temperature. The temperature at which the color density reached 1.00 as visual density was determined and used as the recording temperature.

The color images thus formed were stored for 1 week at 45° C. and 80% RH, and the increase in fog in the uncolored areas and image-remaining ratio in colored areas (i.e., the ratio of the density after storate to the density before the storage) were determined to compare fastness. Further, light exposure properties were compared by exposing the images to 32,000 lux light for 10 hours. The results thus obtained are shown in Table 1.

Preparation of Comparative Samples C-1 to C-3:

Similar tests were conducted in the same manner as with samples 1-5 for changing the electron accepting compounds to other compounds other than those of the present invention also as shown in Table 1. The results thus obtained are also tabulated in Table 1.

TABLE 1

| Sample No. | Electron Donating Colorless Dye | Electron Accepting Compound | Fog Density | Recording Temperature | * Fog Density | * Remaining Ratio | Light Fastness Remaining Ratio |
|---|---|---|---|---|---|---|---|
| 1 | Crystal violet lactone | 1,1-Bis-(4-hydroxyphenyl)-2-ethyl-hexane | 0.07 | 85° C. | 0.10 | 98% | 100% |
| 2 | Crystal violet lactone | 1,1-Bis-(4-hydroxyphenyl)-2-methyl-pentane | 0.08 | 86° C. | 0.10 | 100% | 98% |
| 3 | 3-Diethylamino-7-(o-chloroanilino)-fluoran | 1,1-Bis-(4-hydroxyphenyl)-2-ethyl-hexane | 0.07 | 98° C. | 0.07 | 100% | 100% |
| 4 | 3-Diethylamino-7-(o-chloroanilino)-fluoran | 1,1-Bis-(4-hydroxyphenyl)-2-methyl-pentane | 0.07 | 110° C. | 0.07 | 97% | 100% |
| 5 | 3-Diethylamino-7-(o-chloroanilino)-fluoran | 1,1-Bis-(4-hydroxyphenyl)ethane | 0.08 | 108° C. | 0.10 | 96% | 96% |
| C-1 | 3-Diethylamino-7-(o-chloroanilino)-fluoran | 2,2-Bis-(4-hydroxyphenyl)propane | 0.08 | 148° C. | 0.10 | 20% | 95% |
| C-2 | Crystal violet lactone | 2,2-Bis-(4-hyroxyphenyl)propane | 0.13 | 132° C. | 0.18 | 66% | 81% |
| C-3 | Crystal violet lactone | 1,1-Bis-(4-hydroxyphenyl)propane | 0.14 | 88° C. | 0.22 | 72% | 85% |

*45° C., 80% RH, 1 week.

In Table 1, fog densities higher than 0.13 seriously deteriorate the commercial value of the products. The colored image-remaining ratio is preferably not less than 90%. From this point of view, it is seen that the electron accepting compounds of the present invention provide extremely excellent heat-sensitive recording sheets.

While the invention has been described in detail and with reference to specific embodiments thereof, it will be apparent to one skilled in the art that various changes and modifications can be made therein without departing from the spirit and scope thereof.

What is claimed is:

1. A heat-sensitive recording sheet consisting essentially of a support and a recording layer containing an electron donating colorless dye and a compound represented by the following formula:

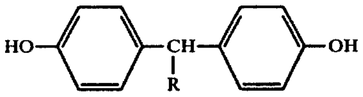

wherein R represents an alkyl group containing 5 to 8 carbon atoms.

2. The heat-sensitive recording sheet of claim 1, wherein said compound is selected from the group consisting of 1,1-bis(4-hydroxyphenyl)hexane, 1,1-bis(4-hydroxyphenyl)heptane, 1,1-bis(4-hydroxyphenyl)octane, 1,1-bis(4-hydroxyphenyl)-2-methyl-pentane, 1,1-bis(4-hydroxyphenyl)-2-ethyl-hexane, and 1,1-bis(4-hydroxyphenyl)dodecane.

3. The heat-sensitive recording sheet of claim 1, wherein said compound has a melting point in the range of about 60° to 130° C.

4. The heat-sensitive recording sheet of claim 1, wherein said electron donating colorless dye is a triarylmethane compound, a diphenylmethane compound, a xanthene compound, a thiazine compound or a spiropyran compound.

5. The heat-sensitive recording sheet of claim 1, wherein the compound of the formula is present in a coating amount of about 0.8 to 5.0 $g/m^2$.

6. The heat-sensitive recording sheet of claim 1, wherein said electron donating colorless dye is present in a coating amount of 0.1 to 2.0 $g/m^2$.

7. The heat-sensitive recording sheet of claim 1, wherein said colorless dye is selected from the group consisting of 3-diethylamino-7-(o-chloroanilino)fluoran, 3-(N-methyl-N-tolylamino)-6-methyl-7-anilinofluoran, and 3-(N-ethyl-N-tolylamino)-6-methyl-7-anilinofluoran.

8. The heat-sensitive recording sheet of claim 1, wherein said alkyl group is a branched chain alkyl group.

* * * * *